UNITED STATES PATENT OFFICE.

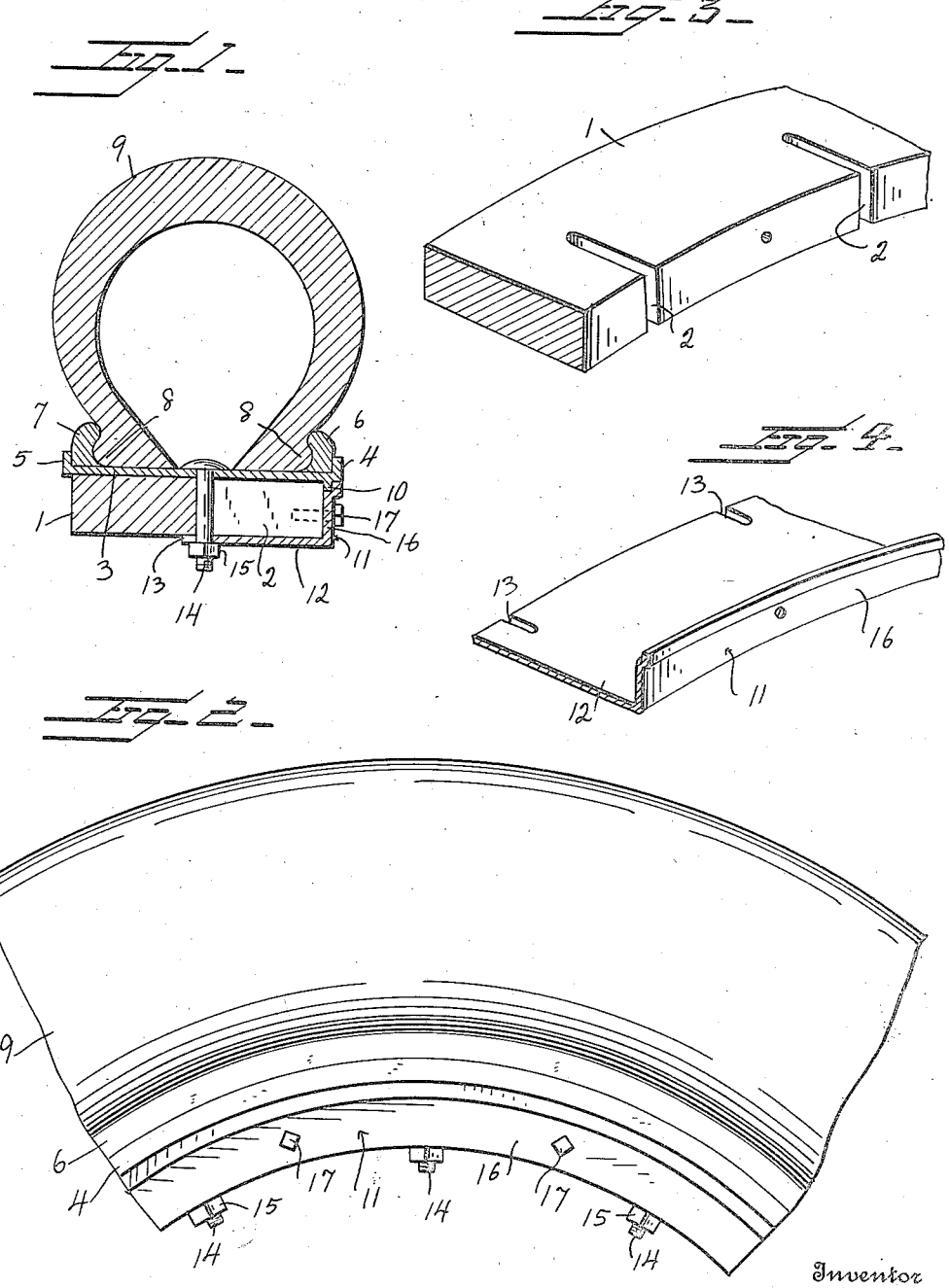

JOSEPH RULDOPH HOLCOMBE, OF NEW YORK, N. Y.

TIRE-MOUNTING AND CLAMP THEREFOR.

1,306,814.

Specification of Letters Patent. Patented June 17, 1919.

Application filed February 15, 1919. Serial No. 277,258.

*To all whom it may concern:*

Be it known that I, JOSEPH R. HOLCOMBE, a citizen of the United States, residing at New York, in the county of New York and State of New York, have invented certain new and useful Improvements in Tire-Mountings and Clamps Therefor, of which the following is a specification, reference being had to the accompanying drawings.

This invention relates to the art of wheels and particularly to an improved tire mounting and mounting clamp for wheel rims.

The invention aims, as one of its objects, to provide a simple, improved, and efficient mounting and mount clamp for tires, and one in which improved features of construction are involved, and one which may be manufactured for small cost and sold at a reasonable profit. One of the features of construction consists in the provision of a rim of general design, having transverse slots extending a trifle more than half-way of the width of the rim, at intervals about the rim, and designed for the reception of bolts, in combination with a clamping band angular in cross-section to engage said bolts and to cover the slots and to overlie a rib on the tire band, thereby holding the parts securely together.

While the design and construction of the device at present illustrated is deemed preferable, it is obvious that the device is susceptible to alterations, when reducing the device to a practical form for commercial purposes. The right to these alterations is claimed, provided they are comprehended within the scope of what is claimed.

The invention comprises further features and combination of parts, hereinafter set forth, shown in the drawings and claimed.

In the drawings:

Figure 1 is a cross-sectional view through the rim of a wheel showing the mounting and the clamp therefor, constructed in accordance with the invention.

Fig. 2 is a view in side elevation of a section of the rim of the wheel, showing the structure of the mounting and the clamp.

Fig. 3 is a detail perspective view of a felly, showing the transverse slots.

Fig. 4 is a detail perspective view of a portion of the clamping band which is angular in cross-section and showing the U-shaped slots for engaging the bolts, which secure the tire band on the felly.

Referring to the drawings 1 designates the felly of a wheel, which is provided at intervals with transversely arranged slots 2. These slots extend substantially half-way the width of the felly. Engaging the felly is a tire supporting band or rim 3, which is provided with radial flanges 4 and 5. This rim or band 3 is split, so that it may be contracted and allowed to be subsequently sprung into fitting engagement with the clencher rings 6 and 7, which are disposed in engagement with the clencher flanges or portions 8 of the tire 9, which is of general construction. The rim or band 3 has an annular rib 10, which overlies the outer edge of the felly. An annular ring or band 11 angular in cross-section is provided, and the cylindrical portion 12 thereof fits on the interior of the felly 1, and is provided with slots or openings 13, to be engaged by the bolts 14. These bolts pass radially through the rim or band 3, and are provided with nuts 15 for holding them in place, the nuts being forced home to closely contact with the cylindrical portion 12 of the ring 11. However, when applying the rim or band 3, the bolts are first inserted in the band, and it is obvious that when slipping the band 3 on the felly, these bolts move laterally through the slots 2. The radial flange 16 of the ring 11 overlies the outer edge of the felly and covers the open ends of the slots 2. This flange 16 also overlies the rib 10, thereby preventing outward movement of the band or rim 3, since the bolts 17 are threaded through the flange 16 and into the felly, at points between the slots 2, thereby producing a secure structure.

The invention having been set forth, what is claimed as new and useful is:

The combination with a felly provided with slots extending substantially half-way its width, of a tire supporting band on the felly carrying bolts, which pass through the slots when slipping the band on the felly, and means for securing the tire supporting band on the felly, said means comprising an annular ring angular in cross-section, engaging the felly, means for securing the ring to the felly, said tire supporting band having a rib to be engaged by a radial flange of the ring, for holding the tire supporting band on the felly, and means on the bolts for clamping against the cylindrical part of the ring.

In testimony whereof I hereunto affix my signature in the presence of two witnesses.

JOSEPH RULDOPH HOLCOMBE.

Witnesses:
ROBERT L. COOPER,
JOSEPH C. BROWN.